Figure 1:
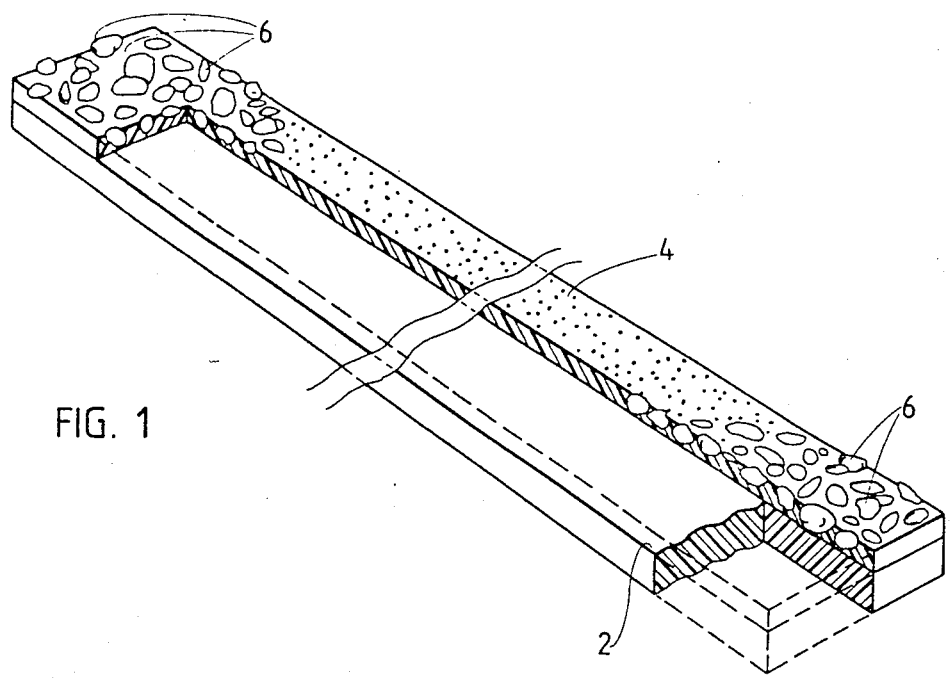

United States Patent [19]

Sperling et al.

[11] Patent Number: 4,665,109

[45] Date of Patent: May 12, 1987

[54] FIBRE REINFORCED MATERIALS AND THERMOPLASTIC REINFORCING FIBRES THEREFOR

[75] Inventors: Bent P. Sperling, Svaneve; 3, DK-2990 Nivaa; Kurt B. Pedersen, Varde, both of Denmark

[73] Assignee: Bent Pagh Sperling, Nivaa, Denmark

[21] Appl. No.: 794,447

[22] Filed: Nov. 4, 1985

Related U.S. Application Data

[63] Continuation of Ser. No. 579,959, Feb. 14, 1984, abandoned.

[30] Foreign Application Priority Data

Feb. 14, 1983 [DK] Denmark ............... 637/83

[51] Int. Cl.[4] ............... C08J 5/06; C08K 7/05; D02G 3/36
[52] U.S. Cl. ............... 523/206; 428/372; 428/373; 428/375; 523/400; 523/500; 523/406; 524/5
[58] Field of Search ............ 428/372, 390, 399, 400, 428/375, 380, 381, 383, 373, 323, 384; 523/206, 400, 500, 406; 524/5

[56] References Cited

U.S. PATENT DOCUMENTS

| 3,050,824 | 8/1962 | Lemelson | 428/372 |
| 3,998,988 | 12/1976 | Shimomai et al. | 428/400 |
| 4,188,890 | 1/1980 | Brumlik | 428/400 |
| 4,379,870 | 4/1983 | Matsumoto | 428/400 |

FOREIGN PATENT DOCUMENTS 1212396  11/1970  United Kingdom ............... 428/364

*Primary Examiner*—Allan M. Lieberman
*Attorney, Agent, or Firm*—Antonelli, Terry & Wands

[57] ABSTRACT

For reinforcing of forming materials of the cold setting type such as concrete or various cross linking plastic materials, solid or foamed, is provided a thermoplastic fibre material, the fibres of which have a surface layer of mineral particles which are partly and only partly embedded in the thermoplastic fibre material, to which the particles are firmly weld bonded, such that the exposed outer particle surfaces are firmly bondable to the forming material. Hereby the mineral particles will form a rigid connection between the forming material and a central fibre core or layer of high tensile strength, whereby the thermoplastic fibres are effectively surface bonded to the forming material so as to show a high reinforcing effect.

12 Claims, 4 Drawing Figures

U.S. Patent    May 12, 1987    4,665,109

FIBRE REINFORCED MATERIALS AND THERMOPLASTIC REINFORCING FIBRES THEREFOR

This is a continuation of application Ser. No. 579,959 filed Feb. 14, 1984 now abandoned.

The present invention relates to fibre reinforced materials and more particularly to material products as reinforced by thermoplastic fibres. In several forming materials, primarily in concrete, reinforcing fibres or webs of a thermoplastic material are superior to ordinary mineral fibres with respect to their chemical resistance, but an associated serious problem is that the thermoplastic fibres show a very low degree of surface bondage to the surrounding forming material. These fibres, particularly when prestretched, may well show a high initial tensile strength, which would condition a very efficient reinforcement, but this effect, of course, is entirely spoiled when the forming material does not effectively adhere to the surface of the fibres.

It has been proposed to modify the thermoplastic fibres by shaping them with a lengthwise varying cross sectional shape, e.g. according to the European Patent application No. 6318, whereby a surrounding forming material will to some degree be mechanically locked to the fibres. Such locking, however, will not at all produce the same ideal reinforcement as achievable by a real surface bondage between the fibres and the matrix, i.e. the forming or moulding material itself.

It is the primary purpose of the invention to provide an effectively reinforced material as containing thermoplastic fibres.

According to the invention the thermoplastic fibres as incorporated in the matrix are provided with a surface bonded layer of hard mineral particles, which are partly and only partly embedded in the surface of the fibres and firmly surface welded thereto over an innermost particle surface portion, while being uncovered by the thermoplastic material over an outer, exposed surface portion so as to be effectively bonded also to the matrix. With the use of such fibres, which have been prefabricated with the mineral particles located surfacewise, a highly improved reinforcement is obtainable without modifying the matrix material, because the latter will readily get bonded, chemically, hydraulically or otherwise, to the exposed surface of the mineral particles, while these remain firmly bonded to the thermoplastic fibres, whereby the fibres are effectively surface bonded to the matrix through the particles.

Thus, the invention is mainly concerned with the thermoplastic fibre material itself, inasfar as it is usable in a conventional manner simply by being incorporated in the matrix.

For the mineral particles to be really bonded to the thermoplastic fibres it is important that such bondage be achieved by the particles being "welded" to the fibres, i.e. brought into contact with the fibre surface with the latter in a melted condition, whereafter a weld like bondage occurs when the melted material sets. Now, as well known, reinforcing thermoplastic fibres should preferably be used in a prestretched condition for showing a good initial tensile strength, and there are certain problems connected with the mineral particles as melted onto or into the fibre surface: The particles may produce a certain notch effect, which may cause the fibre to break during the stretching operation; if the particles are melted on after the stretching the associated heating of the fibre material will be liable to spoil the increased tensile strength as resulting from the stretching. Besides, the said notch effect may generally weaken the fibre.

According to the invention, however, there is provided a modified fibre material, which is well suited for the discussed use, viz. a composite material comprising a base layer of good tensile strength and a surface layer of a thermoplastic material, which is weld bonded to the base layer and in or on which the mineral particles are secured. Hereby the said notch effect will be substantially harmless, because the particles do not penetrate into the strong base layer, and forces are still transferable through the particles because of the firm bondage of the surface layer to both the particles and the base layer. The special base layer may be resistant to the heating as required for the fastening of the mineral particles to the surface layer, whereby the particles may be applied optionally before or after the stretching of the composite fibre material. Principally, the base layer could even be chosen so as to make the fibres usable without being prestretched.

A well suited and easily produced composite fibre material consists of a coextrusion of two thermoplastic materials, of which the base layer has a good tensile strength and a so-called sticking point (temperature of advanced softening and high adhesiveness), which is considerably higher than the sticking point of the coextruded surface layer. The two layers are firmly bonded together by the coextrusion, and the surface layer is heatable for welding reception of the mineral particles without this heating affecting the base layer adversely in any way. The coextrusion may be a film, which is converted into split fibres according to known principles, upon the said mineral particles having been applied to the surface layer of layers at some appropriate stage of the process.

The expression "hard mineral particles" is to be understood in the way that the particles via a crystalline, metallic or mineral character should be well suited to be regularly surface bonded to the matrix material in which the fibres are to be used, just as they should be sufficiently heat resistant and strong to resist the temperatures and stresses as are expected to occur in the final product. In practice, however, this is no problem, since e.g. small stone particles will normally show a fully sufficient strength and bonding ability. The particles, by way of example, may consist of silicium oxide, titanium oxide or other natural and cheap oxides, preferably of a particle size of ca. 50–300 μm; sizes even down to 5–10 μm may be used, and the particle material need not consist of particles of uniform size.

The matrix as referred to will typically be a hydraulic material such as concrete or plaster or a cross linking material such as polyester or epoxy, whether solid or foamed but even warm processed materials such as rubber may be relevant as long as the thermoplastic fibres are kept intact and non-molten. The fibres may be used in free admixture with the matrix or in webs, yarns or ropes as laid into the mouldable or formable material of the matrix.

Figure 2:
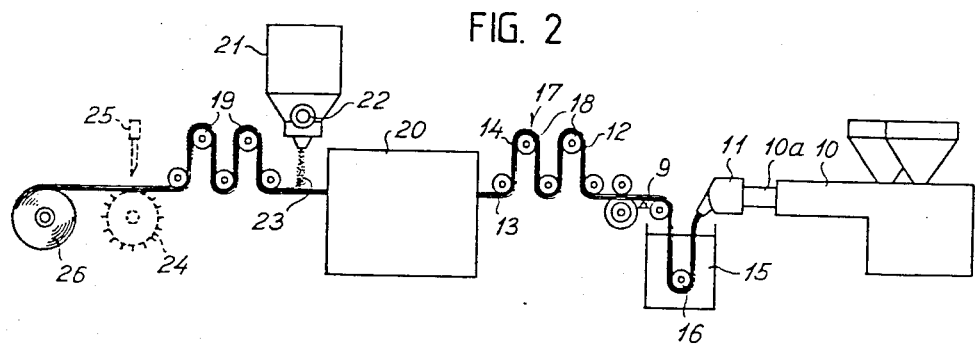
Figure 3:
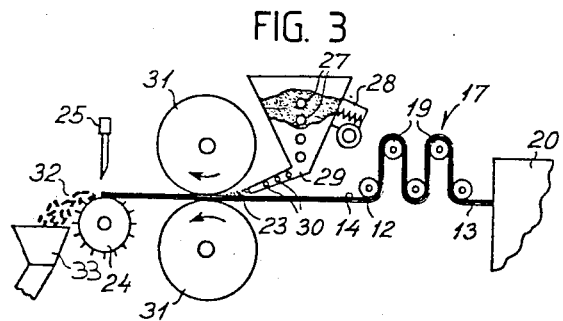
Figure 4:
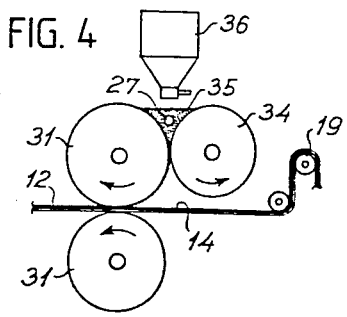

In the following the invention is described in more detail with reference to the drawing, in which:

FIG. 1 is a perspective view, partly in section, of a fibre according to the invention, FIG. 2 is a schematic side view of a production system for such fibres, and FIGS. 3 and 4 are similar views of partly modified production systems.

On the drawing is shown a fibre according to the invention. It consists of a base layer 2 as having a surface layer 4, in or to which is bonded a plurality of mineral particles 6, which are partially melted down in the surface layer 4 such that the underlying surface of the base layer 2 is substantially unbroken by these particles, while their outer surface portions are exposed, uncovered by the material of the surface layer 4. This layer 4 is fuse bonded to the surface of the base layer 2.

The base 2 may consist of a polyolefine such as homopolymer polypropylene with sticking point ca. 165° C., while the surface layer 4 may consist of e.g. a random copolymer propylene with sticking point ca. 120°–140° C. i.e. cheap materials for both layers.

By way of example, these materials may be coextruded into a sandwich film having a total thickness of 200–500 μm, of which the thickness of the base layer 2 may be e.g. 60–90%. The film is split into tapes, e.g. 125 mm in width, which, heated to some 160° C., are caused to be continually stretched to e.g. tenfold length in a stretching operation, whereby the thickness may be reduced to some 100 μm and the tape width to some 40–50 mm. Thereafter, mineral particles 6 are continually sprinkled onto the surface layer 4, the temperature of which may now be some 100° C. The particles are supplied from a particle store with a temperature of e.g. 350° C., i e. a temperature much higher than the general temperature of the film tapes and considerably higher than the sticking point of the surface layer 4. Alternatively the particles may be applied at a lower temperature to the surface layer with the latter heated to above its sticking or melting point.

The mineral particles may be hollow quartz particles as gained from fly ash and having a diameter of 10–250 μm, such particles being obtainable from Nordiska Mineralproduker AB, Sweden, under the trade mark ENLETT 1. Upon the sprinkling on of the hot particles the tapes are moved through a pair of pressure rollers, of which an upper roller as cooperating with the surface particles is kept heated at e.g. 180° C., while the opposed roller as cooperating with the base layer 2 is heated to some 150° C. The two pressure rollers are forced resiliently against each other with a pressure of some 10–50 kp per centimeter along their common pressure line area, this pressure being adjusted such that the larger particles 6 are forced into the layer 4 only down to the surface of the layer 2, but not (or only exceptionally) down into this surface. Thereafter the stretched and now particle carrying tapes are fibrilated in a known manner by means of a fibrilator designed as a rotary needle roller, and the fibrilated tapes are cut into split fibres of any desired length, e.g. 6–12 mm.

When the relatively very hot particles 6 are sprinkled onto the preheated surface layer 4 the particles will immediately start melting the surface layer locally during initial cooling of the particles. Small particles, e.g. of a thickness less than half the thickness of the surface layer, will get cooled so soon that they will intrude into the surface layer to a slight degree only, while relatively large particles as having a much larger heat content may intrude to adjacent the base layer 2, but topwise they will still be exposed outside the surface layer 4; bottomwise they have now been cooled to below the sticking point of the base layer, such that they will not intrude into that layer.

Preferably, however, the intrusion of the particles into the surface layer 4 is accelerated by means of the said pressure rollers, which will operate mainly to force the large particles into the surface layer 4. The particle engaging roller will work very close to the extremely sticky surface of the heated surface layer 4, but it will not contact this surface, because of the presence of the particles. For the same reason it will be advantageous to overdose the particles and later remove the surplus of particles, e.g. by suction for recycling.

Most of the particles will be held to the surface layer 4 both by mechanical intrusion locking and by surface welding, the latter being by far the more important. Even very flat particles, which do not intrude into the layer 4, may be effectively bonded thereto by said welding.

The base layer 2 may have a surface layer 4 on both sides, whereby the particles 6 may be applied in two stages with an intermediate turning of the film strip material or simultaneously to both sides e.g. by spraying onto the surfaces. Principally the invention will also comprise reinforcing fibres produced by fuse spinning so as to have a core of base material and a cylindrical surface layer, which is provided with the said mineral particles or corresponding material fractions, which, in use, may transfer forces between the surrounding moulding material and the strong, reinforcing core material.

The production system shown in FIG. 2 comprises an extruder 10 having a so-called adaptor 10a and an extruder nozzle 11 and being adapted to extrude a sandwich or composite plastic film 12 as consisting of a base layer material and one or two surface material layers located on either one or both sides of the base material layer. The surface material has a crystalline melting point, which is essentially lower than the crystalline melting point of the base material. In the systems as shown in FIGS. 2–4 the film 12 comprises but two layers, viz. a lower base material layer 13 and an upper surface material layer 14.

The film 12 as having left the extruder nozzle 11 is guided through a cooling bath 15 via a guiding roller 16 and is fed to a stretching station generally designated 17. Before being fed to the stretching station 17 the film may, in known manner, be cut into tapes of any suitable width by means of a cutter arrangement 9. The stretching station 17 comprises rollers 18 and 19, of which the rollers 19 rotate with a peripheral speed essentially higher than the peripheral speed of the rollers 18 such that the film or film tapes 12 will be subjected to a pronounced stretching between the two groups of rollers 18 and 19. Between these roller groups the film or film tapes are moved through a tunnel oven 20 serving to maintain the temperature of the plastic film material at an optimal level for the said stretching of the material.

Between the tunnel oven 20 and the roller system 19 is provided a particle supply system 21 shaped as a supply source for small, solid mineral particles such as hollow quartz particles. The supply source or container 21 comprises non-illustrated thermostatically controlled heating means adjusted so as to keep the particles heated to a temperature well above the so-called sticking point of the plastic material in the surface layer 14 of the film 12. Bottomwise of the particle supply system 21 is mounted a slinger rotor (not shown) driven by a motor 22 and serving to sling the heated mineral particles down into the surface material layer 14 through a continuous particle jet 23, the width of which corresponds substantially to the width of the film 12. By a suitable adjustment of the force with which the particles are slung against the surface layer it is achievable that the warm particles intrude suitably into the surface layer as preheated in the tunnel oven 20 so as to get welded thereto. Optionally the particles may be further forced into the surface layer when the film with the prefastened particles passes the roller system 19.

After having passed the roller system 18 the particle carrying film 12 may pass a fibrilator 24, which may be conventionally designed, e.g. as a needle roller or a rotating brush. Upon fibrilation of the stretched film as divided in tapes the fibrilated tapes may be cut into split fibres of a suitable length by means of a cutter device as indicated at 25. Alternatively, the particle carrying film 12 as split into tapes and stretched, whether fibrilated or not, may be wound onto a collector reel, which can be shipped for further processing elsewhere.

In FIG. 3 is shown a preferred production system according to the invention. The particle supply system 21 is a supply container carrying a number of heater elements 27 and a vibrator 28 and arranged between the roller system 19 and the fibrilator 24. At its lower end the supply container has a supply chute 29, which comprises heater elements 30 and is downwardly inclined towards the film 12. After the particle supply system 21 the film 12 passes between two pressure rollers 31, which are forced towards each other with a predetermined force by means of compressed air cylinders (not shown), and the peripheral surfaces of the rollers 31 are kept heated, by heating means not shown, at a temperature close to the sticking point of the upper material layer 14 of the film 12.

In operation of the system of FIG. 3 the stretched film 12 or the stretched film tapes is/are moved under the heated supply chute 29, along which a constant and even flow 23 of particles passes down to the top side of the film web 12, which is immediately thereafter moved through the heated pressure rollers 31, which operate to press the particles into the surface material layer 14, in which the particles are anchored by welding while being partly projecting from the surface of the film 12. The film 12, having passed the pressure rollers 31, may be fed to a fibrilator 24 and a cutting station 25, in which the fibrilated film tapes are cut into split fibres 32, which may be delivered through a conveyor channel 33 to a station of storing, packaging or use.

In the embodiment shown in FIG. 4 the uppermost pressure roller 31 cooperates with an additional roller 34 such that between these rollers a hopperlike space 25 is formed, which serves to receive the mineral particles and to heat them by means of a heater element 27. When the cooperating rollers 31 and 34 rotate as shown by arrows the upper roller 31 will continually move an even layer of particles from the space 35 down to the top side of the film 12, and by passing the two pressure rollers the particles, as already described, will get forced into the upper film layer 14. As the particles are let away from the space 35, this space may be refilled from an overhead supply container 36.

In the already described example, in which the film 12 was made of a base layer of polypropylene as coextruded with a surface layer of a random copolymer polyethylene, the mineral particles were applied with the use of a system according to FIG. 3. The diameter of both of the pressure rollers 31 was 220 mm, and the roller length was 200 mm. The rollers were used for treating a single of the said film tapes of each operation, but with rollers of sufficient length the entire film web as split into several tapes may be treated at one operation. The two rollers 31 were forced together by means of two compressed air cylinders each having a diameter of 80 mm and operated at an air pressure of 7 atm.

As mentioned, the production of composite thermoplastic fibres belongs to the known art, and it will be appreciated that experts in this field will be able to adapt the invention to fibres of various materials other than those here suggested as examples. Thus, for the two layers it would be possible to use polyethylene, HD and LD, respectively, or a polyester as the base layer and a polypropylene as the surface layer, with a layer of a binder material therebetween.

We claim:

1. A reinforcing material comprising thermoplastic fibres, the thermoplastic fibres comprising a base layer of a thermoplastic material that has been stretched, the thermoplastic material of the base layer being of good tensile strength, and a surface layer of a thermoplastic material that has been stretched, which surface layer of a thermoplastic material is weld bonded to the base layer as well as to an outer layer of hard mineral particles, the layer of particles being only partly embedded in the surface of the fibres and being firmly surface welded thereto over an innermost particle surface portion, the particles being generally non-intruding into the base layer, though located closed to this layer, the particles being embedded into the surface of the fibres after stretching of the base and surface layers, whereby the particles are embedded into the surface when the baes and surface layers are stretched, said particles being uncovered by the thermoplastic material over the outer, exposed surface portion and thereby partly exposed.

2. A reinforcing material according to claim 1, wherein the sticking point of the material of the base layer is substantially higher than the sticking point of the material of the surface layer.

3. A reinforcing material according to claim 2, in which the base layer is of a homopolymer polypropylene, while the surface layer is of a random copolymer polypropylene.

4. A reinforcing material according to claim 1, in which the thickness of the base layer is 50-95% of the total thickness of the base layer and the surface layer.

5. A reinforcing material according to claim 1, in which the particles are of a size between 10 and 500 μm.

6. A reinforcing material according to claim 1, wherein the particles are partly embedded in the surface layer of the fibres by sprinking the particles on the surface of the fibres and then applying pressure to the particles so as to partly embed the particles in the surface layer of the fibres.

7. A fibre reinforced material in which thermoplastic fibres are incorporated in a matrix material of the hydraulic or cross linking type, characterized in that the thermoplastic fibres comprise a base layer of a thermoplastic material that has been stretched, the thermoplastic material of the base layer being of good tensile strength, and a surface layer of a thermoplastic material that has been stretched, which surface layer of a thermoplastic material is weld bonded to the base layer as well as to an outer layer of hard mineral particles, and characterized in that the layer of particles is only partly embedded in the surface of the fibres and is firmly surface welded thereto over an innermost particle surface portion, the particles being generally non-intruding into the base layer, though located close to this layer, the particles being embedded into the surface of the fibres after stretching of the base and surface layers, whereby the particles are embedded into the surface when the base and surface layers are stretched, said particles being uncovered by the thermoplastic material over the outer, exposed surface portion and thereby partly exposed to the matrix, said particles being made of a material that bonds to the matrix material, whereby the particles are effectively bonded to the matrix material.

8. A fibre reinforced material according to claim 7, wherein the particles are made of a material that chemically bonds to the matrix material.

9. A fibre reinforced material according to claim 7, wherein said base layer and surface layer are co-extruded layers.

10. A fibre reinforced material according to claim 7, wherein the particles are made of silicon oxide or titanium oxide, having particle sizes of 50-300 μm.

11. A fibre reinforced material according to claim 7, wherein the matrix material is selected from the group consisting of concrete, plaster, a polyester material and an epoxy material.

12. A fibre reinforced material according to claim 7, further comprising a layer of a binder material between said base layer and said surface layer.

* * * * *